United States Patent [19]

Endo et al.

[11] Patent Number: 4,874,807

[45] Date of Patent: Oct. 17, 1989

[54] SELF-LUBRICATING THERMOPLASTIC RESIN WEAR PART

[75] Inventors: Toshihiko Endo; Nobuyuki Matsunaga, both of Fuji, Japan

[73] Assignee: Polyplastics Co., Ltd., Osaka, Japan

[21] Appl. No.: 191,304

[22] Filed: May 6, 1988

[30] Foreign Application Priority Data

May 8, 1987 [JP] Japan ................................. 62-112074

[51] Int. Cl.$^4$ .............................................. C08K 5/54
[52] U.S. Cl. ..................................... 524/267; 524/263
[58] Field of Search ................ 524/263, 267; 525/398, 525/446

[56] References Cited

U.S. PATENT DOCUMENTS

| | | | |
|---|---|---|---|
| 3,491,048 | 1/1970 | Sargent | 524/267 |
| 4,131,594 | 12/1978 | Nakamura et al. | 524/504 |
| 4,387,176 | 6/1983 | Frye | 524/395 |
| 4,472,556 | 9/1984 | Lipowitz et al. | 525/398 |
| 4,485,212 | 11/1984 | Wefer | 525/64 |
| 4,487,858 | 12/1984 | Lovgren et al. | 524/267 |
| 4,647,609 | 3/1987 | O'Brien | 524/267 |

FOREIGN PATENT DOCUMENTS

| | | | |
|---|---|---|---|
| 61-254665 | 11/1986 | Japan | 524/267 |
| WO86/03213 | 6/1986 | World Int. Prop. O. | 524/267 |

*Primary Examiner*—Lewis T. Jacobs
*Attorney, Agent, or Firm*—Nixon & Vanderhye

[57] ABSTRACT

A self-lubricating wear part is formed of a thermoplastic resin composition which exhibits improved durability to abrasion. The resin composition includes a thermoplastic polyester resin or polyacetal resin in an amount between 99.9 to 80.0 parts by weight, and a silicon oil having a viscosity of 150,000 cSt or more in an amount between 0.1 to 20 parts by weight.

3 Claims, No Drawings

SELF-LUBRICATING THERMOPLASTIC RESIN WEAR PART

The present invention relates to a resin composite capable of providing a self-lubricating wear part exhibiting excellent long-term frictional characteristics producing only slight frictional noise during sliding. In particular, the invention relates to a thermoplastic resin composition comprising a thermoplastic polyester resin or a polyacetal resin and an silicon oil having the viscosity of 150,000 cSt.

BACKGROUND OF THE INVENTION

Thermoplastic polyester resins, such as poly-butylene terephthalate and poly-ethylene terephthalate, or polyacetal resins have been used in a number of end-use applications as engineering resins in recent years since they exhibit superior mechanical and electrical properties, heat and, chemical resistances, and workability. And, there is a tendency that these resins will be used under still more severe conditions with an expansion of their end-use applications. As such, these resins are required to exhibit improved properties for many such end-use applications. Some of these properties are an improved frictional characteristic, long-term durability of the improved frictional characteristics, a reduction of frictional noise due to the sliding or the like of a part formed of such resins, such as sliding members and mechanism members for cars, electric and electronic products and the like.

For example, it is known that (1) solid lubricants, such as molybdenum disulfide and graphite, (2) powdery and fibrous poly-tetrafluoroethylene resin (3) liquid or semi-solid lubricants, such as petroleum lubricating oils, synthetic lubricating oils, aliphatic alcohols or their esters, are added; and the like may be added as a means of improving the frictional and abrasive characteristics of thermoplastic resins. It goes without saying that some improvements in the frictional and abrasive characteristics by these known methods ensue and in particular the requirements can be met in those situations where a part formed of such resins is used only for a short time under sliding conditions at relatively slow speeds and loads. However, problems have occurred in that the frictional characteristics become insufficient as the sliding speed and load increase. The frictional characteristics therefore significantly deteriorate over time in use even under sliding conditions at low speeds and loads. In addition, it is known that polyethylene, poly-tetrafluoroethylene and the like may be added to soften resins, and has been generally used as a method of improving frictional noise when sliding. However, with this known technique, a silencing property capable of meeting the requirements cannot always be attained. In addition, problems have occurred in that physical properties, such as mechanical strength, decrease.

As above described, according to the conventional known techniques, the requirements, which are being increasingly made more severe, cannot be met with respect to frictional and abrasive characteristics, in particular characteristic under high speed and high sliding conditions or in terms of load, long-term anti-friction or silencing characteristics when sliding. Accordingly, improvement in these areas has been needed.

SUMMARY OF THE INVENTION

The present inventors have found that improvements to long-term frictional and abrasive characteristics and reduced frictional noise when sliding (without deleteriously affecting excellent properties incidental to thermoplastic polyester resins) and polyacetal resins are achieved by the addition of silicon oils having a specified viscosity.

That is to say, it is an object of the present invention to provide a thermoplastic resin composite comprising a thermoplastic polyester resin or a polyacetal resin of 99.9 to 80.0 parts by weight and a silicon oil having a viscosity of 150,000 cSt or more of 0.1 to 20 parts by weight.

The thermoplastic polyester used in the present invention includes polyesters obtained by the poly-condensation of dicarboxylic compounds and dihydroxy compounds, the poly-condensation of oxycarboxylic compounds, the poly-condensation of these three ingredients mixture and the like. Both homopolyesters and copolyesters are effective to the present invention.

The dicarboxylic acid compounds used in the present invention include known dicarboxylic acid compounds, such as terephthalic acid, isophthalic acid, naphthalene dicarboxylic acid, diphenyl dicarboxylic acid, diphenylether dicarboxylic acid, diphenylethane dicarboxylic acid, cyclohexane dicarboxylic acid, adipic acid and sebacic acid, and alkyl-, alcoxy- or halogen-substituted compounds thereof. In addition, these dicarboxylic acid compounds can be used also in the form of ester-formable derivatives, and as lower alcohol esters, for example dimethyl ester. In the present invention, the above described compounds are used singly or in combination.

Nextly, the dihydroxy compounds include dihydroxy compounds, such as ethylene glycol, prpylene glycol, butane diol, neopentyl glycol, hydroquinone, resorcine, dihydroxy phenyl, naphthalene diol, dihydroxydiphenyl ether, cyclohexane diol and 2,2'-bis (4-hydroxyphenyl) propane, alkyl-, alcoxy- or halogen-substituted compounds thereof and the like. They can be used singly or in combination.

In addition, oxycarboxylic acids include oxycarboxylic acids, such as oxybenzoic acid, oxynaphthoeic acid and diphenylene oxycarboxylic acid, and alkyl-, alcoxy- or halogen-substituted compounds thereof. Also ester-formable derivatives of these compounds can be used. In the present invention, these compounds can be used singly or in combination.

According to the present invention, every thermoplastic polyester formed by the poly-condensation of the above described compounds as monomers can be used singly or in combination. It is desired to use polyalkylene terephthalate, preferably polybutylene terephthalate. In this case, the effects of the present invention are notable.

In addition, in the present invention, the thermoplastic polyesters may be denatured by known methods, such as cross-linkage and graft-polymerization.

The polyacetal resins used in the present invention include polyacetal homepolymers and polyacetal copolymers of which greater part of a main chain is formed of an oxymethylene chain. In addition, even though polyacetals are denatured by crosslinking or graft-copolymerizing according to the known methods, they can be used as the basic resin and the effects of the present invention can be exhibited.

Nextly, dimethyl-polysiloxane or compounds obtained by substituting a part of methyl groups in dimethyl-polysiloxane with at least one kind selected from the group consisting of hydrogen, phenyl group, halogenized phenyl group, halogenized alkyl group, fluoroester group and the like having a remarkably high viscosity of 150,000 cSt (at 25° C.) as measured according to ASTM D-445 are used as the silicon oils added to the above described thermoplastic resins in the present invention.

If the silicon oils having a low viscosity lower than 150,000 cSt, in particular a viscosity of 100,000 cSt or less, are added, the initial frictional and abrasive characteristics are improved but the long-term frictional and abrasive characteristics or the frictional noise when sliding, which are aimed in the present invention, can not be sufficiently improved while if the rubbery silicon resins having a high degree of polymerization are used, not only it is remarkably difficult to unimormly disperse them in the resins and the improvement of frictional and abrasive characteristics can not be expected but also mechanical properties are spoiled according to circumstances, which are not desirable. The silicon oils having a viscosity of 200,000 to 1,000,000 cSt are more preferably used.

In addition, in the present invention, such silicon oils are added at a ratio of 0.1 to 20 parts by weight based on the thermoplastic resin of 99.9 to 80 parts by weight. If the silicon oils are added at a ratio less than this, the sufficient improvement of frictional and abrasive characteristics can not be attained while if the silicon oils are added at a ratio more than this, the workability, mechanical properties and the like are remarkably lowered according to circumstances, which are not desirable.

Accordingly, in view of the balance of the short-term and long-term frictional and abrasive characteristics, other properties, workability and the like, it is desired that the silicon oils are added at a ratio of 0.3 to 10 parts by weight.

In addition, in the present invention, such silicon oils can be diluted with solvents and the like or can be adsorbed by inorganic or organic solid bodies to be added. This is desirable in many cases in view of the workability of the addition of the silicon oils and the dispersivity of the silicon oils. In addition, it is desirable for the improved dispersion of the silicon oils in the resin also to use a dispersion medium at the same time.

Although the reason of the excellent long-term frictional and abrasive characteristics and silencing property due to the use of such highly viscous silicon oils has not been always obvious, the present inventors guess that such highly viscous silicon oils form a stable film, which can not be easily separated, on the surface of the resin or in the vicinity of said surface of the resin, whereby the effect is durable. On the contrary, it is guessed by the present inventors that the low viscosity silicon oils are apt to bleed to the surface of the resin, so that the initial frictional characteristics are superior but the viscosity is low (the degree of polymerization is low), whereby the separation and removal of the film are apt to occur, and as a result, the frictional characteristics are lowered with a lapse of the sliding time.

In order to further improve the sliding characteristics, solid lubricants, such as graphite, molybdenum disulfide and metal soap, polymers, such as polyethylene resin and polytetrafluoroethylene resin, capable of giving an excellent lubricating property and the like can be added to the composite according to the present invention. In addition, in order to improve physical properties according to objects, various kinds of known additive can be further added.

The additives include an anti-oxidant, weather- and light-resisting stabilizer, heat stabilizer, unguent, releasing agent, nuclear agent, silicon oil dispersion agent, antistatic agent, flame retardant, coloring agent and the like.

In addition, fibrous, plate-like and granular inorganic fillers, such as glass fiber, can be added to the composite according to the present invention according to objects. In addition, it goes without saying that other resins or high molecular substances can be supplementarily added.

The composite according to the present invention can be easily prepared by the known methods which have been generally used as the methods of preparing the conventional resin composites. For example, a method, in which the ingredients are mixed and then, the mixture is kneaded and extruded in a uniaxial or biaxial extruder to prepare pellets followed by molding, a method, in which pellets having a different composition are once prepared and then, the resulting pellets are blended in an appointed quantity to be subjected to the molding followed by obtaining a molded product having the aimed composition, a method, in which at least one of ingredients is directly charged in a molding machine, and the like can be all applied.

PREFERRED EMBODIMENTS

The present invention is more concretely described below with the reference of the preferred embodiments but not limited by them.

EXAMPLES 1 TO 9 AND COMPARATIVE EXAMPLES 1 TO 8

A poly-butylene terephthalate resin ["DURANEX 2000" manufactured by Polyplastics Co., Ltd.] or a polyacetal resin ["DURACON M90" manufactured by Polyplastics Co., Ltd.] and various kinds of silicon oil having a viscosity of 150,000 cSt or more were blended at a ratio shown in Table 1 and then, the resulting mixture was molten and kneaded in a biaxial extruder to prepare a pellet-like composite. Subsequently, these pellets were injection molded to prepare test pieces which were evaluated. In addition, for comparison, also test pieces without containing silicon oils and test pieces containing silicon oils having a viscosity outside of the range according to the present invention were evaluated in the same manner as the above described test pieces. All of the results are shown in Table 1.

In addition, the evaluation of sliding characteristics was carried out by the following methods and that of tensile characteristics was carried out in compliance with the method of ASTM.

KINEMATIC FRICTIONAL CHARACTERISTICS

Kinematic friction factor was measured immediately after the start of sliding and after sliding for 60 minutes at a pressure of 0.75 kg/cm$^2$, a linear speed of 180 mm/sec, and a contact area of 2.0 cm$^2$ with ABS resin as the opposite material using a Suzuki type friction and abrasion tester. In addition, in order to obtain a standard of the stability, a time until the dynamic friction factor ($\mu$d) amounts to 0.2 was measured.

FRICTIONAL NOISE CHARACTERISTICS

The state of generating the frictional noise during a time while materials of the same kind are scrubbed to each other for 10 hours was observed at a pressure of 3.5 kg/cm$^2$, a linear speed of 50 mm/sec and a contact area of 2.0 cm$^2$ using the above described tester.

As obvious from the above description and preferred embodiments, various kinds of characteristic, such as longterm frictional and abrasive characteristics and frictional noise when sliding, relating to the sliding are remarkably improved and also a disadvantage that other physical properties are lowered to an extent substantially called in question does not occur by adding a silicon oil having a viscosity of 150,000 cSt or more to a thermoplastic polyester resin or a polyacetal resin.

As above described, a composite according to the present invention has balanced excellent properties and can be suitably used as a sliding member, such as gear, bearing and key board part, in the fields of cars, electric and electronic instruments, office machineries, miscellaneous goods and the like.

TABLE 1

| | Composition | | | | Dynamic frictional characteristics | | | | Tensile characteristics | | |
|---|---|---|---|---|---|---|---|---|---|---|---|
| | Resin | | Silicon oil | | Friction factor (μd) | | Time until the friction factor amounts to 0.2 (min.) | Frictional noise characteristics | Tensile strength (kg/cm²) | Elongation (%) | Note |
| | Kind | Quantity added (parts by weight) | Viscosity (cSt) | Quantity added (parts by weight) | Initial | After 60 minutes | | | | | |
| Example | | | | | | | | | | | |
| 1 | Poly-butylene terephthalate | 99.5 | 300,000 | 0.5 | 0.16 | 0.32 | 7 | Slight noise | 531 | 52 | Excellent extrudability Excellent moldability |
| 2 | " | 99 | " | 1 | 0.15 | 0.27 | 10 | " | 512 | 76 | " |
| 3 | " | 98 | " | 2 | 0.15 | 0.23 | 30 | Almost none | 474 | 138 | " |
| 4 | " | 95 | " | 5 | 0.15 | 0.18 | 120< | " | 412 | 200< | " |
| 5 | " | 99 | 1,000,000 | 1 | 0.17 | 0.28 | 12 | Slight noise | 521 | 81 | " |
| 6 | " | 98 | " | 2 | 0.14 | 0.22 | 35 | Almost none | 466 | 130 | " |
| 7 | " | 95 | " | 5 | 0.15 | 0.18 | 120< | " | 407 | 200< | " |
| Comparative example | | | | | | | | | | | |
| 1 | " | 100 | — | — | 0.30 | 0.50 | 0 | Large | 569 | 38 | Excellent extrudability |
| 2 | " | 98 | 500 | 2 | 0.11 | 0.46 | 2 | Middle to small | 472 | 124 | Slightly unmeasurable moldability |
| 3 | " | 99 | 5,000 | 1 | 0.14 | 0.47 | 2 | " | 516 | 69 | Excellent extrudability Excellent moldability |
| 4 | " | 98 | " | 2 | 0.11 | 0.47 | 3 | " | 465 | 146 | Excellent extrudability |
| 5 | " | 95 | " | 5 | 0.12 | 0.44 | 5 | " | 409 | 200< | Slightly unmeasurable moldability |
| 6 | " | 98 | 60,000 | 2 | 0.12 | 0.43 | 4 | " | 468 | 142 | " |
| Example | | | | | | | | | | | |
| 8 | " | 98 | 300,000 | 2 | 0.15 | 0.17 | 120< | Almost none | 521 | 142 | Excellent extrudability Excellent moldability |
| 9 | " | 98 | 1,000,000 | 2 | 0.14 | 0.17 | 120< | " | 517 | 155 | " |
| Comparative example | | | | | | | | | | | |
| 7 | Polyacetal | 100 | — | — | 0.21 | 0.38 | 0 | Large | 625 | 67 | " |
| 8 | " | 98 | 5,000 | 2 | 0.13 | 0.33 | 10 | Middle | 518 | 148 | " |

What is claimed is:

1. A self-lubricating wear part having improved anti-friction and anti-frictional noise characteristics formed of a thermoplastic resin composition which consists essentially of (i) between 99.9 to 80.0 parts by weight of a thermoplastic polyester or polyacetal resin, and (ii) a self-lubricating effective amount between 0.1 to 20 parts by weight of a silicon oil having a viscosity of 150,000 cSt or more.

2. A self-lubricating wear part as in claim 1, wherein the silicon oil has a viscosity of between 200,000 to 1,000,000 cSt.

3. A self-lubricating wear part as in claim 2, wherein the thermoplastic polyester resin is selected from polyalkylene therephthalate and polybutylene terephthalate.

* * * * *

UNITED STATES PATENT AND TRADEMARK OFFICE
CERTIFICATE OF CORRECTION

PATENT NO. : 4,874,807

DATED : October 17, 1989

INVENTOR(S) : Endo et al

It is certified that error appears in the above-identified patent and that said Letters Patent is hereby corrected as shown below:

Column 1, line 20, after "and" (first occurrence) delete the comma (,);
line line 38, after "esters," delete "are added;";
line 65, change "characteristic" to --characteristics--;
line 66, before "sliding" insert --load-- and after "terms of" delete "load,".

Column 2, line 37, change "prpylene" to --propylene--;
line 62, change "homepolymers" to --homopolymers--;
line 63, delete "greater" and insert --a major-- and after "part of" delete "a" and insert --the--;
line 64, after "oxymethylene" delete "chain" and insert --units--.

Column 3, line 11, after "a" delete "low";
line 16, after "sliding," insert --(-- and after "are" delete "aimed" and insert --objects-- and after "invention," insert --)--;
line 17, after "improved" delete "while" and insert a period (.); before "if" insert --On the other hand,--;
line 19, change "it is" to --is it-- and after "to" change "unimormly" to --uniformly--;
line 51, delete "guess" and insert --assume--;
line 56, delete "guessed" and insert --assumed--.

Signed and Sealed this

Twenty-sixth Day of February, 1991

Attest:

HARRY F. MANBECK, JR.

Attesting Officer

Commissioner of Patents and Trademarks